US012586845B2

(12) United States Patent
 Pitts et al.

(10) Patent No.: US 12,586,845 B2
(45) Date of Patent: Mar. 24, 2026

(54) PHASE CHANGE MATERIAL (PCM)-BASED CONDUCTIVE THERMAL ACTUATOR SWITCH

(71) Applicant: Raytheon Company, Waltham, MA (US)

(72) Inventors: Andrew J. Pitts, Maynard, MA (US); James E. Benedict, Chelmsford, MA (US)

(73) Assignee: Raytheon Company, Arlington, VA (US)

( * ) Notice: Subject to any disclaimer, the term of this patent is extended or adjusted under 35 U.S.C. 154(b) by 755 days.

(21) Appl. No.: 17/932,780

(22) Filed: Sep. 16, 2022

(65) Prior Publication Data

US 2023/0081977 A1    Mar. 16, 2023

Related U.S. Application Data

(60) Provisional application No. 63/244,906, filed on Sep. 16, 2021.

(51) Int. Cl.
 *H01M 10/659*     (2014.01)
 *H01M 10/617*     (2014.01)
 *H01M 10/653*     (2014.01)

(52) U.S. Cl.
 CPC ....... *H01M 10/659* (2015.04); *H01M 10/617* (2015.04); *H01M 10/653* (2015.04)

(58) Field of Classification Search
 CPC ............. H01M 10/659; H01M 10/617; H01M 10/653; Y02E 60/10; F28F 13/00; F28F 2013/008; F28F 2270/00
 See application file for complete search history.

(56) References Cited

U.S. PATENT DOCUMENTS

| | | | |
|---|---|---|---|
| 3,463,224 A | 8/1969 | Myers | |
| 4,212,346 A | 7/1980 | Boyd | |

(Continued)

FOREIGN PATENT DOCUMENTS

| | | |
|---|---|---|
| CN | 113097599 A | 7/2021 |
| JP | S60-117090 A | 6/1985 |

(Continued)

OTHER PUBLICATIONS

International Search Report and Written Opinion of the International Searching Authority dated Nov. 6, 2023 in connection with International Patent Application No. PCT/US2023/029004, 11 pages.

(Continued)

*Primary Examiner* — Muhammad S Siddiquee

(57) ABSTRACT

An apparatus includes multiple thermal actuator switches configured to control a transfer of thermal energy. The thermal actuator switches are arranged in a stacked configuration. Each switch includes first and second plates and a piston movable between the plates. Each switch also includes a phase change material configured to (i) expand to move a surface of the piston into a first position and (ii) contract to allow the surface of the piston to move into a second position. The surface of the piston thermally contacts the first plate and increases thermal energy transfer between the plates when in one of the first and second positions. The surface of the piston is spaced apart from the first plate and decreases thermal energy transfer between the plates when in another of the first and second positions. Different ones of the switches include different phase change materials that expand or contract at different temperatures.

20 Claims, 11 Drawing Sheets

(56) References Cited

U.S. PATENT DOCUMENTS

| | | | |
|---|---|---|---|
| 4,388,965 A | 6/1983 | Cunningham et al. | |
| 5,317,875 A | 6/1994 | O'Brien et al. | |
| 6,308,518 B1 | 10/2001 | Hunter | |
| 8,956,021 B2 | 2/2015 | Hessling | |
| 9,234,682 B2 | 1/2016 | Edwards et al. | |
| 10,809,747 B2 | 10/2020 | Andres | |
| 2006/0087816 A1 | 4/2006 | Ewes et al. | |
| 2006/0141308 A1* | 6/2006 | Becerra | H01M 8/04552 |
| | | | 429/432 |
| 2007/0257766 A1 | 11/2007 | Richards et al. | |
| 2009/0032218 A1* | 2/2009 | Wayman | F28F 13/00 |
| | | | 165/80.3 |
| 2010/0065263 A1* | 3/2010 | Tanchon | F25D 19/006 |
| | | | 165/277 |
| 2014/0363718 A1* | 12/2014 | Andres | H01M 10/613 |
| | | | 165/277 |
| 2017/0321966 A1* | 11/2017 | Lueckenbach | H01L 23/427 |
| 2019/0179351 A1* | 6/2019 | Andres | H01M 10/63 |
| 2020/0135614 A1* | 4/2020 | Al Omari | F28D 20/02 |
| 2020/0217518 A1 | 7/2020 | Field et al. | |
| 2020/0371155 A1 | 11/2020 | Walczyk et al. | |

FOREIGN PATENT DOCUMENTS

| | | |
|---|---|---|
| JP | 2008-135191 A | 6/2008 |
| JP | 2013-037919 A | 2/2013 |
| WO | 2014156991 A1 | 10/2014 |
| WO | 2023044410 A1 | 3/2023 |

OTHER PUBLICATIONS

Lankford, "10 Heat Switches", 2007, 19 pages.
Wang et al., "Development of a phase change material (PCM)-based thermal switch", Hkie Transactions, vol. 24, No. 2, 2017, 6 pages.
Geng et al., "A self-adaptive thermal switch array for rapid temperature stabilization under various thermal power Inputs", Journal of Micromechanics and Microengineering, Jul. 2011, 9 pages.
International Search Report and Written Opinion of the International Searching Authority dated Dec. 1, 2022 in connection with International Patent Application No. PCT/US2022/076532, 8 pages.
Final Office Action dated Jun. 27, 2024 in connection with U.S. Appl. No. 18/361,311, 25 pages.
Non-Final Office Action dated Sep. 16, 2024 in connection with U.S. Appl. No. 18/361,311, 30 pages.
Notice of Reasons for Refusal dated Mar. 18, 2025 in connection with Japanese Patent Application No. 2024-516452, 6 pages.
Non-Final Office Action dated Apr. 4, 2024 in connection with U.S. Appl. No. 18/361,311, 23 pages.
Decision to Grant a Patent dated Apr. 22, 2025 in connection with Japanese Patent Application No. 2024-516452, 5 pages.
Notice of Reasons for Refusal dated Mar. 11, 2025 in connection with Japanese Patent Application No. 2024-516452, 6 pages.
Notice of Reasons for Rejection dated Jan. 27, 2026 in connection with Japanese Patent Application No. 2025-515389, 24 pages.

* cited by examiner

100

102

104

110

108

PHASE CHANGE MATERIAL (PCM)-BASED CONDUCTIVE THERMAL ACTUATOR SWITCH

CROSS-REFERENCE TO RELATED APPLICATION AND PRIORITY CLAIM

This application claims priority under 35 U.S.C. § 119(e) to U.S. Provisional Patent Application No. 63/244,906 filed on Sep. 16, 2021. This provisional patent application is hereby incorporated by reference in its entirety.

TECHNICAL FIELD

This disclosure is generally directed to thermal systems. More specifically, this disclosure is directed to a phase change material (PCM)-based conductive thermal actuator switch.

BACKGROUND

Thermal management is typically required or desired in various electronic devices, powered systems, and other devices or systems where thermal energy (heat) can adversely impact performance of or damage device or system components. For example, batteries often experience heating during use, and thermal management is typically required or desired in order to maintain the batteries within specified temperature ranges. These temperature ranges can be defined to maintain operational efficiency of the batteries, ensure long-term usage of the batteries, or avoid damage to the batteries.

SUMMARY

This disclosure is directed to a phase change material (PCM)-based conductive thermal actuator switch.

In a first embodiment, an apparatus includes multiple thermal actuator switches configured to control a transfer of thermal energy through the apparatus, where the thermal actuator switches are arranged in a stacked configuration. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position. The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

In a second embodiment, a system includes at least one heat source and at least one heat sink. The system also includes multiple thermal actuator switches configured to control a transfer of thermal energy between the at least one heat source and the at least one heat sink, where the thermal actuator switches are arranged in a stacked configuration. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position. The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

In a third embodiment, a method includes receiving thermal energy at multiple thermal actuator switches from at least one heat source, where the thermal actuator switches are arranged in a stacked configuration. The method also includes controlling a transfer of the thermal energy between the at least one heat source and at least one heat sink using the thermal actuator switches. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position. The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
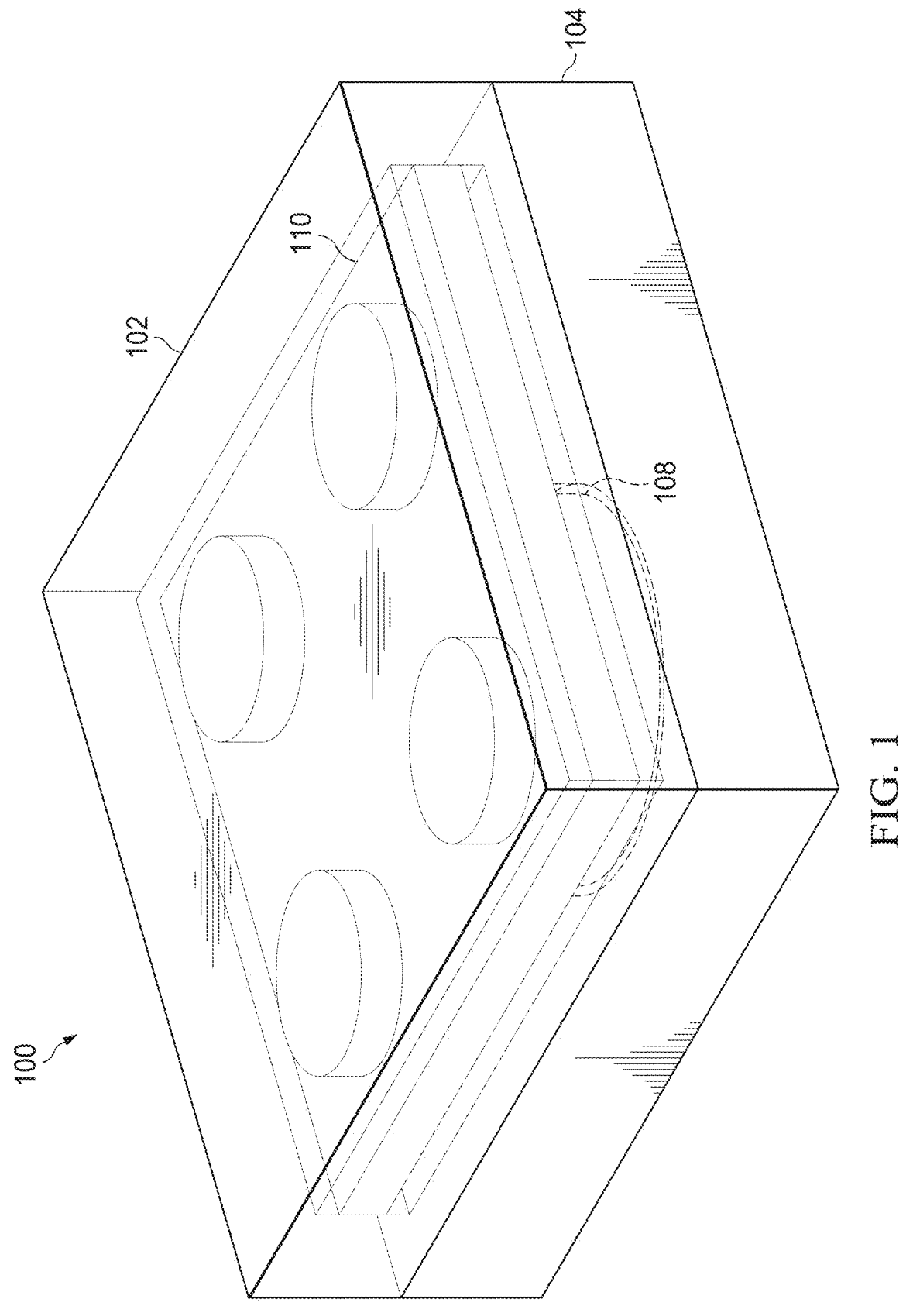
FIGS. 1 through 4 illustrate an example phase change material (PCM)-based conductive thermal actuator switch according to this disclosure.

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, thermal management is typically required or desired in various electronic devices, powered systems, and other devices or systems where thermal energy (heat) can adversely impact performance of or damage device or system components. For example, batteries often experience heating during use, and thermal management is typically required or desired in order to maintain the batteries within specified temperature ranges. These temperature ranges can be defined to maintain operational efficiency of the batteries, ensure long-term usage of the batteries, or avoid damage to the batteries.

This disclosure provides various thermal actuator switches that can be used for thermal management or other purposes. Each of the thermal actuator switches includes a piston that can be used to form and break a thermal connection or otherwise facilitate and impede thermal energy transfer between at least one heat source (such as a power-dissipating or warmer device) and at least one heat sink (such as a cold plate). At least one phase change material (PCM) in each thermal actuator switch can change phase and expand/contract based on localized heating/cooling in the thermal actuator switch to move the piston within the thermal actuator switch. In some cases, when the phase change material in a thermal actuator switch is heated, the phase change material can expand and move the piston in the thermal actuator switch to form a thermal connection (or improve a thermal connection) between the heat source(s) and the heat sink(s). When the phase change material in the thermal actuator switch is cooled, the phase change material can contract, and a spring-loaded mechanism, a magnet, or other return mechanism can be used to push or pull the piston and break the thermal connection (or lessen the thermal connection) between the heat source(s) and the heat sink(s). Other configurations can have a phase change material that expands when cooled and that contracts when heated, which again can move the piston to form (or improve) and break (or lessen) a thermal connection.

In this way, the phase change material in each thermal actuator switch can be used to provide passive switching of the thermal actuator switch. Also, the actuation of each thermal actuator switch can be used to control the contacting surface area between the piston and another component of the thermal actuator switch, which allows the surface area used for thermal energy transfer to be easily controlled. In some embodiments, the actuation of each thermal actuator switch is linear based on the movement of the piston. Further, through the use of the return mechanism, each thermal actuator switch may be used to repeatedly form and break (or increase and decrease) the thermal connection between the heat source(s) and the heat sink(s).

In addition, multiple thermal actuator switches may be used in any suitable serial and/or parallel arrangement(s) to provide desired thermal energy transfer paths between at least one heat source and at least one heat sink. For example, an array of parallel thermal actuator switches may be positioned across at least one battery or other heat source(s) and used to transfer thermal energy away from the heat source(s). This may be useful, for instance, in reducing or avoiding the creation of a temperature gradient across the surface(s) of the heat source(s). As another example, multiple thermal actuator switches may be stacked in series, where different thermal actuator switches have phase change materials that expand/contract at different temperature thresholds. This may, for example, allow the overall thermal transfer behavior of the thermal actuator switches to be tuned for a particular application. As a particular example, this may allow the stacked thermal actuator switches to form/break (or facilitate/inhibit) one or more thermal connections between the heat source(s) and the heat sink(s) at different temperatures. As a result, for instance, one of multiple stacked thermal actuator switches may form or improve a thermal connection between the heat source(s) and the heat sink(s) at a lower temperature to enable a first rate of thermal energy transfer. Another of the stacked thermal actuator switches may form or improve the same or another thermal connection between the heat source(s) and the heat sink(s) at a higher temperature to enable a second (larger) rate of thermal energy transfer. Combinations of these approaches may also be used, such as when multiple sets of series-coupled (stacked) thermal actuator switches are arranged in a parallel array.

Figure 2:
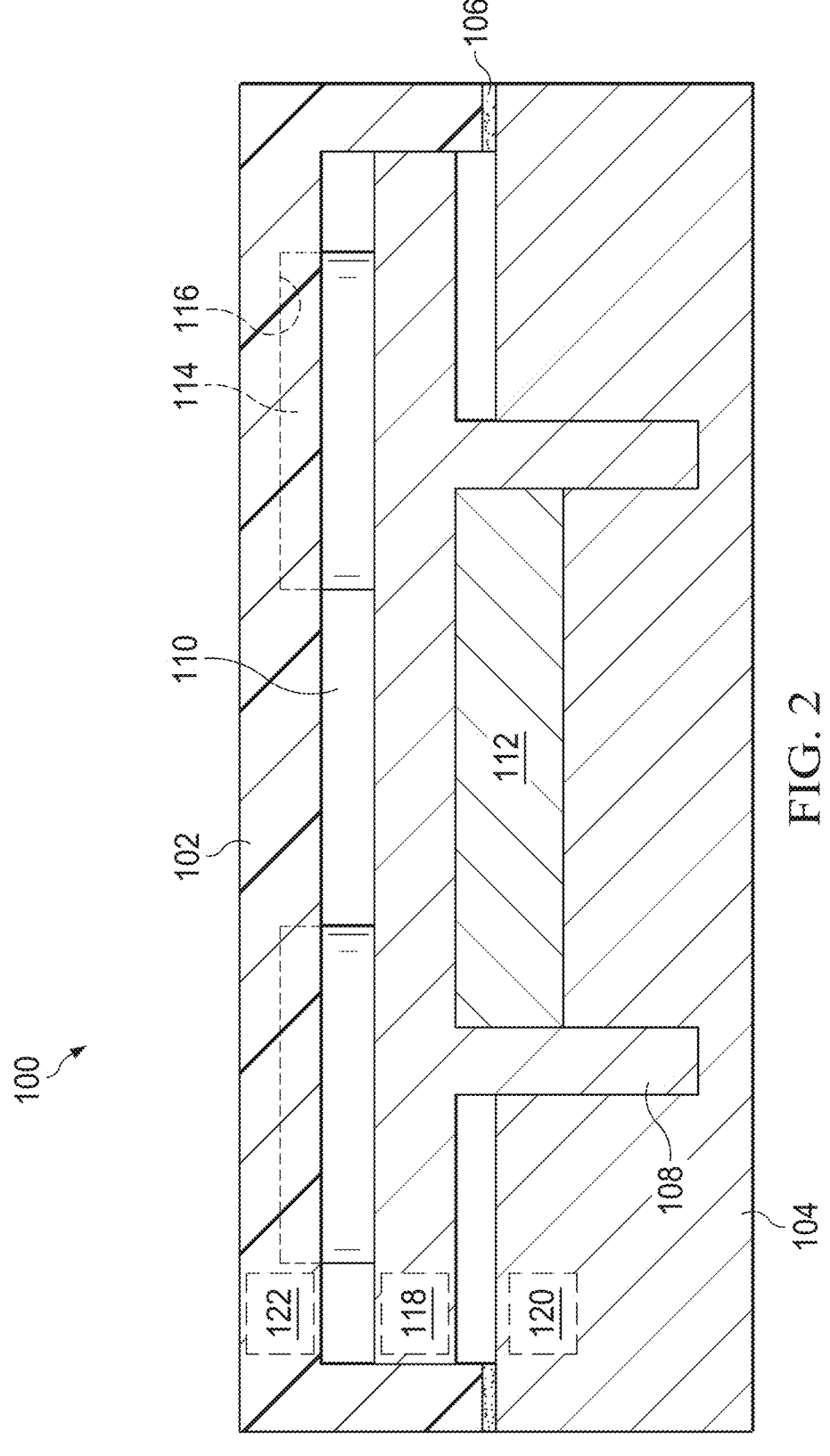
Figure 3:
Figure 4:
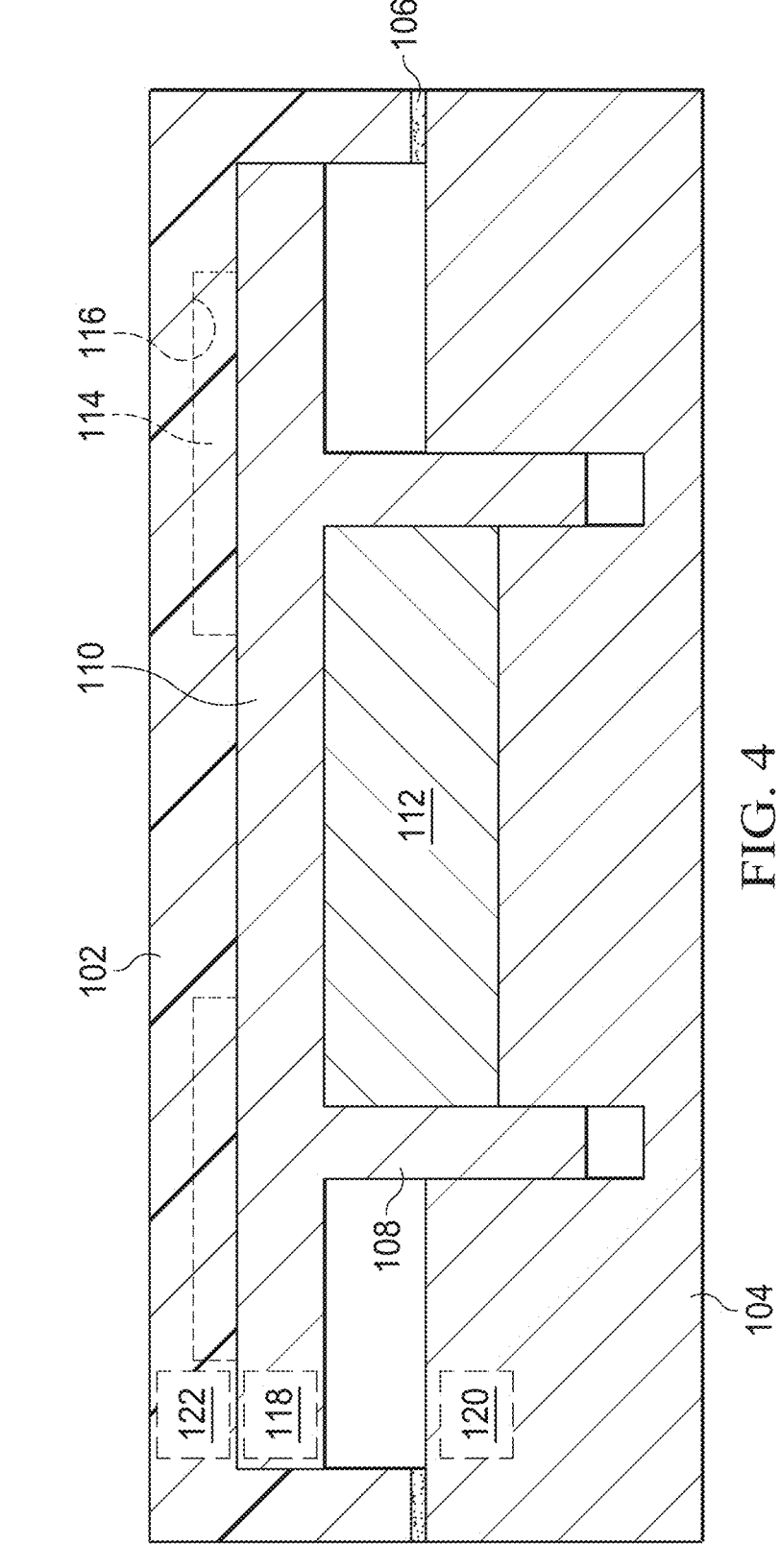

FIGS. 1 through 4 illustrate an example PCM-based conductive thermal actuator switch 100 according to this disclosure. In particular, FIGS. 1 and 3 illustrate perspective views of the thermal actuator switch 100 in different operational configurations, and FIGS. 2 and 4 illustrate cross-sectional views of the thermal actuator switch 100 in the different operational configurations. Note that certain components of the thermal actuator switch 100 in FIGS. 1 and 3 are shown in transparent outline form for ease of illustration and explanation.

As shown in FIGS. 1 and 2, the thermal actuator switch 100 may include or be associated with a housing, such as one formed using a top plate 102 and a bottom plate 104. Each plate 102 and 104 represents a structure that can be thermally coupled to at least one heat source or at least one heat sink. For example, the top plate 102 may be thermally coupled to at least one heat sink, and the bottom plate 104 may be thermally coupled to at least one heat source (or vice versa). Each plate 102 and 104 may be formed using any suitable material(s), such as one or more metals or other material(s) having high thermal conductivity. Each plate 102 and 104 may also be formed in any suitable manner. In addition, each plate 102 and 104 may have any suitable size, shape, and dimensions.

In some cases, the plates 102 and 104 may optionally be separated by a thermally-insulative material 106, which is shown only in FIGS. 2 and 4 for ease of illustration. The thermally-insulative material 106 can help to reduce or minimize the thermal conductivity between the plates 102-104, which can help to reduce or minimize thermal energy transfer between the plates 102-104 themselves except when needed or desired. The thermally-insulative material 106 may be formed from any suitable material(s), such as a thermally-insulative epoxy or other material(s) used to attach the plates 102-104 or a fiberglass washer or other structure(s) positioned between the plates 102-104. The thermally-insulative material 106 may also be formed in any suitable manner. In addition, the thermally-insulative material 106 may have any suitable size, shape, and dimensions.

A piston formed by a piston base 108 and a piston plate 110 is positioned and movable between the plates 102 and 104. For example, the top plate 102 may include a recess formed between sidewalls of the plate 102, and at least part of the piston plate 110 can be positioned and movable up and down within this recess. Similarly, the bottom plate 104 may include a recess formed between sidewalls of the plate 104, and at least part of the piston base 108 can be positioned and movable up and down within that recess. The piston formed by the piston base 108 and the piston plate 110 may be formed using any suitable material(s), such as one or more metals or other material(s) having high thermal conductivity.

The piston may also be formed in any suitable manner. In addition, the piston may have any suitable size, shape, and dimensions.

As shown in this example, the piston base 108 may take the form of an annular cylinder or other structure having an internal cavity, and a phase change material 112 is positioned within the internal cavity of the piston base 108. In this particular example, the phase change material 112 is positioned between the piston plate 110 and a portion of the bottom plate 104 that projects into the piston base 108. The phase change material 112 is thereby able to contact a portion of the bottom plate 104, and the bottom plate 104 can prevent downward. movement of the phase change material 112. The phase change material 112 represents at least one material that can expand and contract suitable amounts based on temperature.

The phase change material 112 is used in the thermal actuator switch 100 to move the piston plate 110 between different positions in order to facilitate or inhibit thermal energy transfer between the plates 102 and 104. For example, in FIGS. 1 and 2, the phase change material 112 is in a contracted state, which in some cases may occur when the phase change material 112 is at a lower temperature. In this state, the piston plate 110 is spaced apart from the top plate 102, at least along the major upper surface of the piston plate 110. The side surfaces of the piston plate 110 may or may not contact the top plate 102 here. In this operational configuration, thermal energy transfer between the plates 102-104 can be reduced or minimized. As a result, there may be little thermal energy transfer between the heat source(s) and the heat sink(s) that are thermally coupled to the plates 102-104. In some embodiments, the piston plate 110 may be completely separated from and not contact the plate 102 at all in this operational configuration.

In FIGS. 3 and 4, the phase change material 112 is in an expanded state, which in some cases may occur when the phase change material 112 is at a higher temperature. In this state, the piston plate 110 contacts the top plate 102, at least along the upper major surface of the piston plate 110. Again, the side surfaces of the piston plate 110 may or may not contact the top plate 102 here. In this operational configuration, thermal energy transfer between the plates 102-104 can be increased or maximized because the piston base 108 and the piston plate 110 contact both plates 102-104 simultaneously, providing a pathway for thermal energy to flow between the plates 102-104 through the highly-conductive piston. As a result, there may be much higher thermal energy transfer between the heat source(s) and the heat sink(s) that are thermally coupled to the plates 102-104. Note here that the thermally-insulative material 106 can help to thermally insulate the plates 102-104 from each other, such as when the thermally-insulative material 106 has sufficient thickness to produce a high thermal resistance. This forces thermal energy to travel between the plates 102-104 primarily through the piston, rather than flowing directly between the plates 102-104 themselves, which would inadvertently thermally short circuit (fully or to some degree) the intended function of the actuator.

In this way, the thermal actuator switch 100 uses the phase change material 112 to passively control heat transfer between the heat source(s) and the heat sink(s) that are thermally coupled to the plates 102-104. That is, the thermal actuator switch 100 can use the volumetric expansion and volumetric contraction properties of the phase change material 112 to actuate the piston plate 110 between two positions, which causes the surface contact area between the top plate 102 and the piston plate 110 to increase and decrease based on temperature. In some cases, the movement of the piston plate 110 may be performed in a completely passive manner, meaning the piston plate 110 is moved due to the expansion and contraction of the phase change material 112 based on thermal energy received from the heat source(s) and rejected to the heat sink(s). No additional heaters or coolers may be required here to cause expansion or contraction of the phase change material 112 (although that may not be the case in other embodiments).

Moreover, the thermal actuator switch 100 here may allow for rigid contact between the heat source(s) and the heat sink(s). In some cases, the thermal actuator switch 100 allows for rigid contact in the entire volume between the heat source(s) and the heat sink(s). This is because the plates 102-104 can be securely coupled to one another, which in some cases can provide large stable surfaces along the top of the top plate 102 and along the bottom of the bottom plate 104 (such as for mechanical couplings). In addition, depending on the design of the thermal actuator switch 100, the thermal actuator switch 100 can provide for tunable thermal isolation in the "thru" direction (vertically in FIGS. 1 through 4) and tunable thermal isolation in the "in-plane" direction (horizontally in FIGS. 1 through 4).

Note that the heat source(s) and the heat sink(s) used with the thermal actuator switch 100 may represent any suitable source(s) and destination(s) for thermal energy. For example, in a "cold environment" scenario, at least one heater may be used to heat one or more devices. In this scenario, the one or more devices to be heated can represent the heat source, and at least one cold plate can be provided that represents the heat sink. Here, one or more thermal actuator switches 100 can be used to remove excess thermal energy from the one or more devices to the cold plate(s), such as when excessive thermal energy is provided to the one or more devices by the heater. In this example, limited heater power may be conserved while increasing or maximizing structural support for the one or more devices (since the thermal actuator switches 100 may primarily remain in the opened position shown in FIGS. 1 and 2), The one or more devices here may represent any suitable device(s) to be heated, such as one or more batteries, processors, or other devices used in a cold environment (such as in space applications). In some cases, the one or more thermal actuator switches 100 can be opened and closed to help keep the one or more devices between upper and lower target operating temperatures or within a target operating temperature range.

In a "hot environment" scenario, one or more devices may generate heat, and at least one cold plate can be used to receive thermal energy from the one or more devices in order to cool the one or more devices. In this scenario, the one or more devices can represent the heat source, and the at least one cold plate can represent the heat sink. Here, one or more thermal actuator switches 100 can be used to facilitate the transfer of thermal energy between the one or more devices and the cold plate(s). In this example, thermal energy dissipation to the heat sink may be maximized, such as when the thermal actuator switches 100 primarily remain in the closed position shown in FIGS. 3 and 4. The one or more devices here may represent any suitable device(s) to be cooled, such as one or more batteries, processors, or other devices. Again, in some cases, the one or more thermal actuator switches 100 can be opened and closed to maintain the one or more devices between upper and lower target operating temperatures or within a target operating temperature range.

When the phase change material 112 contracts here, the piston may need external assistance in order to separate the piston plate 110 from the top plate 102. Any suitable return mechanism may be used here to provide the force needed to separate the piston plate 110 from the top plate 102. In some embodiments, for example, one or more springs 114 can be positioned between the piston plate 110 and the top plate 102. The top plate 102 in this example includes recesses 116, although recesses may also or alternatively be included in the piston plate 110. As shown in FIGS. 1 and 2, when the phase change material 112 is contracted, the springs 114 can help to push the piston plate 110 away from the top plate 102. As shown in FIGS. 3 and 4, when the phase change material 112 expands, the spring force of the springs 114 is overcome, which compresses the springs 114 and allows the piston plate 110 to contact the top plate 102.

Note that the use of one or more springs 114 represents one example return mechanism for moving the piston plate 110 away from the top plate 102. However, other return mechanisms are also possible, For instance, at least one magnet 118 may be positioned in or on the piston plate 110, and the at least one magnet 118 may be attracted to one or more magnets 120 in or on the bottom plate 104 and/or repelled by one or more magnets 122 in or on the top plate 102. In these embodiments, any suitable number of magnets may be used in any suitable positions in the piston plate 110 and one or more of the plates 102-104. The use of magnetism may offer some reliability improvements over the use of springs 114 (such as potential hysteresis associated with mechanical springs), although the actual reliabilities of springs and magnets can vary depending on the implementation.

One or more instances of the thermal actuator switch 100 may find use in a large number of applications. For example, the thermal actuator switches 100 may be used in numerous devices where batteries, processors, or other components need to be maintained at specified temperatures or within specified temperature ranges. As particular examples, the thermal actuator switches 100 may be used in satellites, unmanned aerial vehicles, and other systems where limiting power consumption may be necessary or desirable and where passive designs can improve long-term reliability. As other particular examples, the thermal actuator switches 100 may be used in manufacturing systems or manufacturing messaging systems, such as in additive manufacturing systems. In general, this disclosure is not limited to any particular application of the thermal actuator switch 100, and this disclosure is not limited to any particular types of heat source(s) and heat sink(s) used with the thermal actuator switch 100.

Figure 5:
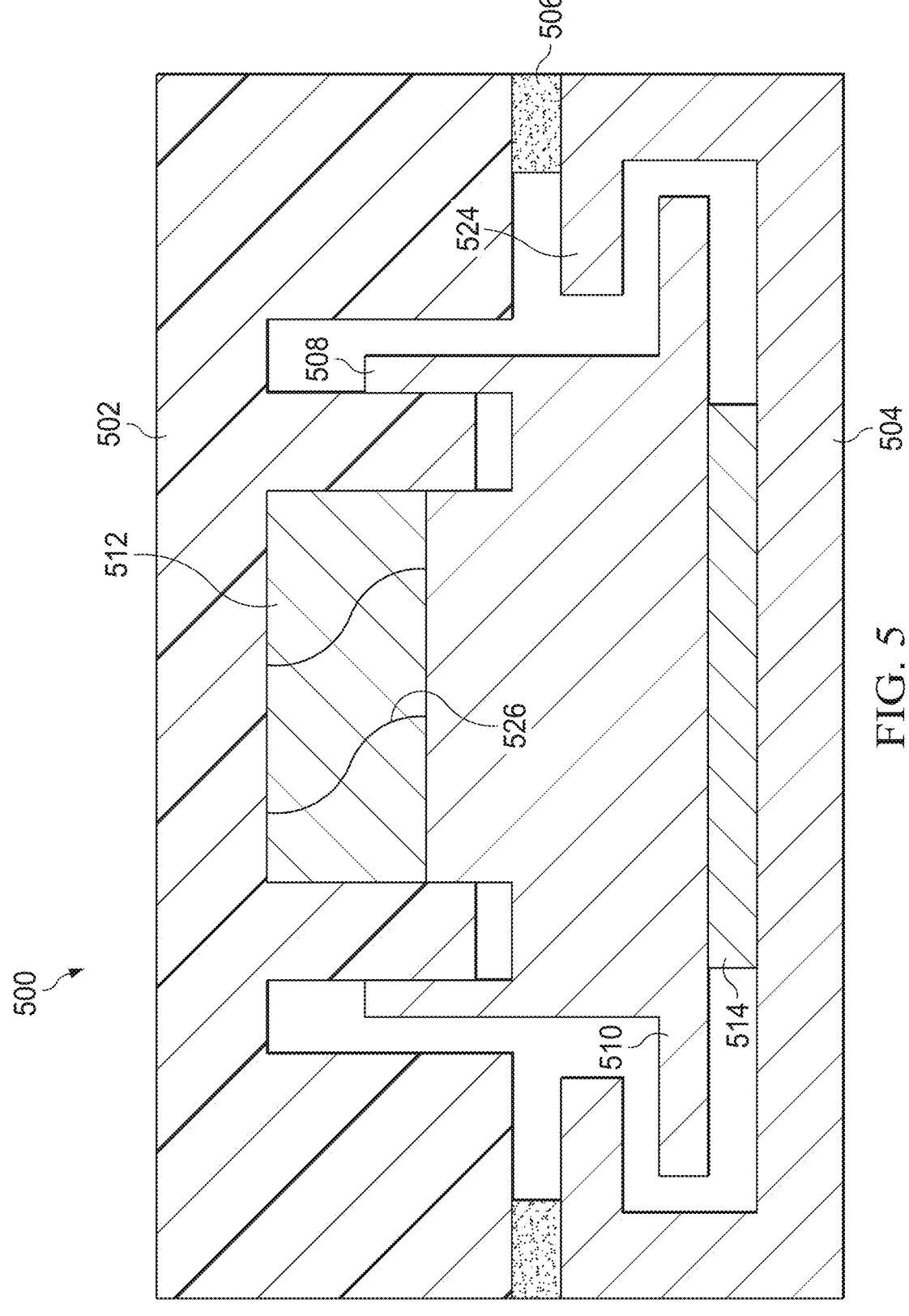
FIGS. 5 and 6 illustrate another example PCM-based conductive thermal actuator switch according to this disclosure.
Figure 6:
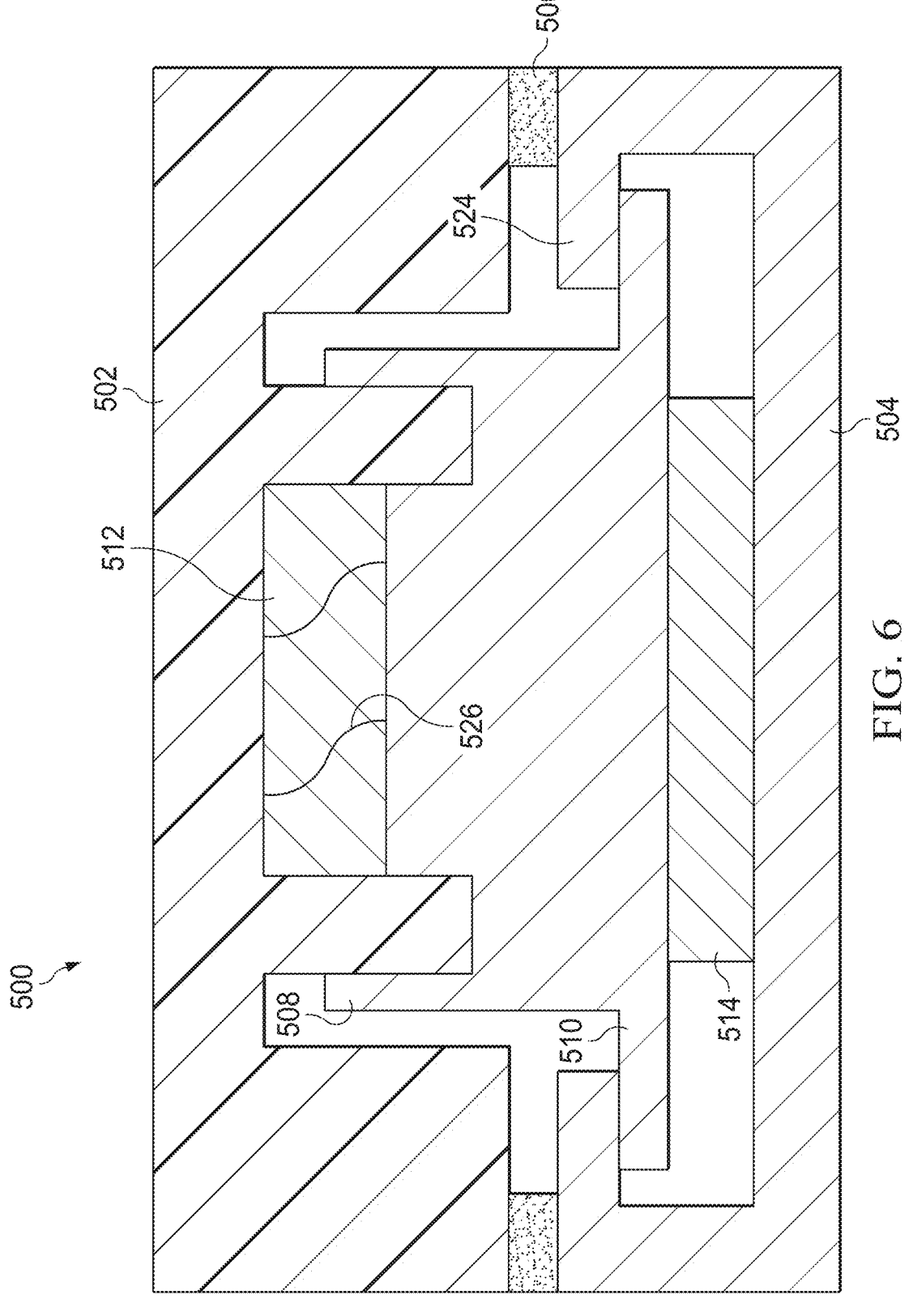

FIGS. 5 and 6 illustrate another example PCM-based conductive thermal actuator switch 500 according to this disclosure. The thermal actuator switch 500 has many of the same design characteristics (and the same advantages, benefits, and applications) as the thermal actuator switch 100 described above. For brevity, only some of these design characteristics are described below, but the various design characteristics, advantages, benefits, and applications of the thermal actuator switch 100 described above are equally applicable to the thermal actuator switch 500.

As shown in FIGS. 5 and 6, the thermal actuator switch 500 includes a top plate 502 and a bottom plate 504, which may be optionally separated by a thermally-insulative material 506. A piston formed by, a piston base 508 and a piston plate 510 is positioned and movable between the plates 502 and 504. For example, the top plate 502 may include a recess formed between sidewalls of the plate 502, and at least part of the piston base 508 can be positioned and movable up and down within this recess. Similarly, the bottom plate 504 may include a recess formed between sidewalls of the plate 504, and at least part of the piston plate 510 can be positioned and movable up and down within that recess. In some cases, the piston base 508 may take the form of an annular cylinder or other structure having an internal cavity. In this example, the top plate 502 itself defines an internal cavity within which a phase change material 512 is positioned, and the internal cavity of the top plate 502 may or may not reside within an internal cavity of the top plate 502 (depending on the design of the piston). In this particular example, the phase change material 512 is positioned between the piston base 508 and a portion of the top plate 502. The phase change material 512 is thereby able to contact a portion of the top plate 502, and the top plate 502 can prevent upward movement of the phase change material 512. The phase change material 512 represents at least one material that can expand and contract suitable amounts based on temperature.

In this example, the piston can be used to selective form (or improve) and break (or lessen) a thermal connection between the plates 502 and 504. More specifically, when the phase change material 512 is in an expanded state as shown in FIG. 5, the piston plate 510 is pushed away from one or more flanges or other projections 524 of the bottom plate 504, helping to reduce or lessen the thermal connection. When the phase change material 512 is in a contracted state as shown in FIG. 6, the piston plate 510 is pushed into the one or more flanges or other projections 524 of the bottom plate 504, helping to form or improve the thermal connection. Note, however, that the positions of the piston plate 510 and the flange(s) or other projection(s) 524 of the bottom plate 504 could be reversed, such as when the piston plate 510 is positioned over the flange(s) or other projection(s) 524 of the bottom plate 504. In that case, expansion of the phase change material 512 can form/improve the thermal connection by pushing the piston plate 510 into the flange(s) or other projection(s) 524, and contraction of the phase change material 512 can break/lessen the thermal connection by allowing the piston plate 510 to move away from the flange(s) or other projection(s) 524.

One or more springs 514 can be used as a return mechanism to provide a force needed to push the piston plate 510 into the flanges or other projections 524 of the bottom plate 504 (in the configuration shown here) or to push the piston plate 510 away from the flanges or other projections 524 of the bottom plate 504 (in the alternate configuration where the piston plate 510 is above the flanges or other projections 524). Note, however, that other return mechanism may be used in the thermal actuator switch 500, such as at least some of the magnets 118-122 described above. While not shown here, a recess may be formed in the bottom plate 504 for each spring 514 in a similar manner as the recesses 116 described above.

One or more thermal straps 526 may optionally be positioned within the phase change material 512 and possibly extend from the top plate 502 to the piston base 508. The thermal strap(s) 526 may be used to help heat the phase change material 512 more rapidly in response to an elevated temperature or cool the phase change material 512 more rapidly in response to a lowered temperature, which can help the phase change material 512 to change phase more rapidly. While the thermal strap(s) 526 may permit a small amount of thermal energy transfer between the top plate 502 and the piston base 508, there may be little thermal energy transfer between the plates 502 and 504 while the piston plate 510 is spaced apart from the flanges or projections 524. Each thermal strap 526 may be formed from any suitable material(s), such as one or more metals, a pyrolytic graphite sheet, or other material(s) having high thermal conductivity. Each thermal strap 526 may also be formed in any suitable manner and have any suitable size, shape, and dimensions. In addition, any suitable number of thermal straps 526, including a single strap, may be used here.

Figure 7:
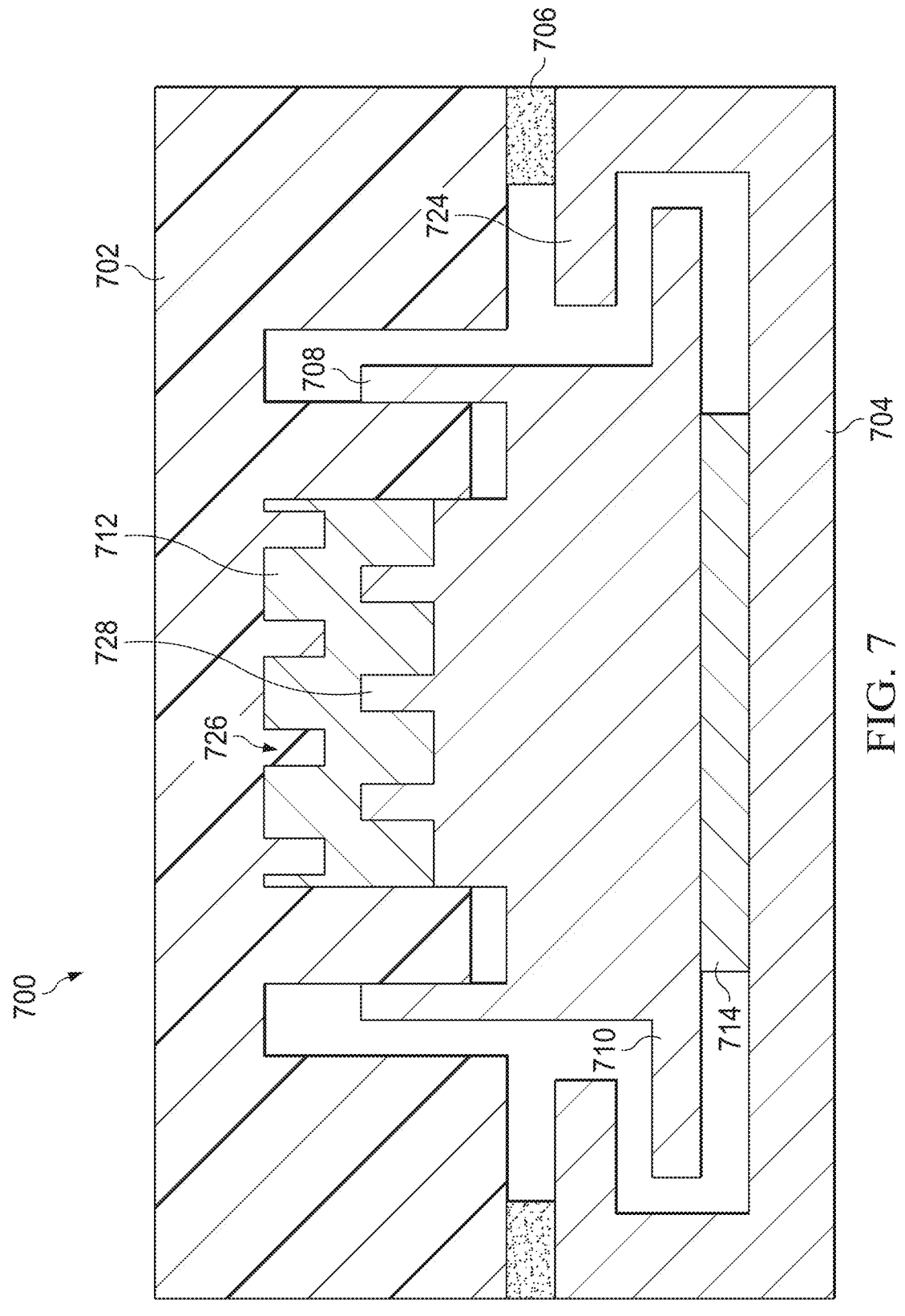
FIGS. 7 and 8 illustrate another yet example PCM-based conductive thermal actuator switch according to this disclosure.
Figure 8:
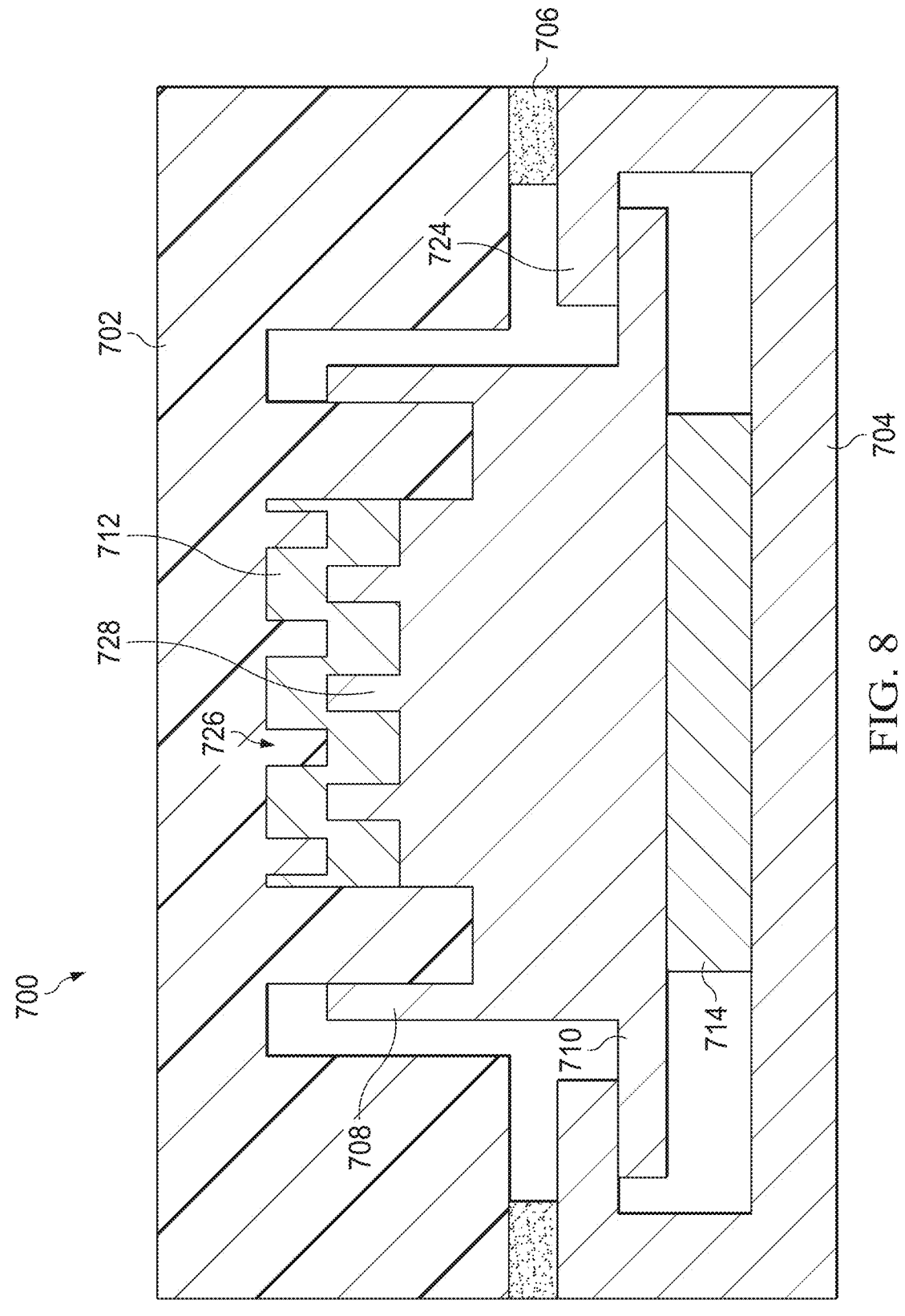

FIGS. 7 and 8 illustrate yet another example PCM-based conductive thermal actuator switch 700 according to this disclosure. The thermal actuator switch 700 has many of the same design characteristics (and the same advantages, benefits, and applications) as the thermal actuator switches 100 and 500 described above. For brevity, only some of these design characteristics are described below, but the various design characteristics, advantages, benefits, and applications of the thermal actuator switches 100 and 500 described above are equally applicable to the thermal actuator switch 700.

As shown in FIGS. 7 and 8, the thermal actuator switch 700 includes a top plate 702 and a bottom plate 704, which may be optionally separated by a thermally-insulative material 706. A piston formed by a piston base 708 and a piston plate 710 is positioned and movable between the plates 702 and 704. For example, the top plate 702 may include a recess formed between sidewalls of the plate 702, and at least part of the piston base 708 can be positioned and movable up and down within this recess. Similarly, the bottom plate 704 may include a recess formed between sidewalls of the plate 704, and at least part of the piston plate 710 can be positioned and movable up and down within that recess. In some cases, the piston base 708 may take the form of an annular cylinder or other structure having an internal cavity. In this example, the top plate 702 itself defines an internal cavity within which a phase change material 712 is positioned, and the internal cavity of the top plate 702 may or may not reside within an internal cavity of the top plate 702 (depending on the design of the piston). In this particular example, the phase change material 712 is positioned between the piston base 708 and a portion of the top plate 702. The phase change material 712 is thereby able to contact a portion of the top plate 702, and the top plate 702 can prevent upward movement of the phase change material 712. The phase change material 712 represents at least one material that can expand and contract suitable amounts based on temperature.

In this example, the piston can be used to selective form (or improve) and break (or lessen) a thermal connection between the plates 702 and 704. More specifically, when the phase change material 712 is in an expanded state as shown in FIG. 7, the piston plate 710 is pushed away from one or more flanges or other projections 724 of the bottom plate 704, helping to reduce or lessen the thermal connection. When the phase change material 712 is in a contracted state as shown in FIG. 8, the piston plate 710 is pushed into the one or more flanges or other projections 724 of the bottom plate 704, helping to form or improve the thermal connection. Note, however, that the positions of the piston plate 710 and the flange(s) or other projection(s) 724 of the bottom plate 704 could be reversed, such as when the piston plate 710 is positioned over the flange(s) or other projection(s) 724 of the bottom plate 704. In that case, expansion of the phase change material 712 can form/improve the thermal connection by pushing the piston plate 710 into the flange(s) or other projection(s) 724, and contraction of the phase change material 712 can break/lessen the thermal connection by allowing the piston plate 710 to move away from the flange(s) or other projection(s) 724.

FIG. One or more springs 714 can be used as a return mechanism to provide a force needed to push the piston plate 710 into the flanges or other projections 724 of the bottom plate 704 (in the configuration shown here) or to push the piston plate 710 away from the flanges or other projections 724 of the bottom plate 704 (in the alternate configuration where the piston plate 710 is above the flanges or other projections 724). Note, however, that other return mechanism may be used in the thermal actuator switch 700, such as at least some of the magnets 118-122 described above. While not shown here, a recess may be formed in the bottom plate 704 for each spring 714 in a similar manner as the recesses 116 described above.

FIG. One or more projections 726 of the top plate 702 can extend into the internal cavity in which the phase change material 712 is positioned. Also or alternatively, one or more projections 728 of the piston base 708 can extend into the internal cavity in which the phase change material 712 is positioned. In some cases, both projections 726 and projections 728 can be used and can be interleaved or otherwise used in different lateral locations. Either or both projections 726 and 728 can be used to provide a larger surface area through which thermal energy can flow into and out of the phase change material 712, top plate 702, or piston base 708. As a result, either or both projections 726 and 728 may be used to help heat the phase change material 712 more rapidly in response to an elevated temperature or cool the phase change material 712 more rapidly in response to a lowered temperature, which can help the phase change material 712 to change phase more rapidly. Each projection 726 and 728 may be formed in any suitable manner and have any suitable size, shape, and dimensions. Also, any suitable number of projections 726 (including no projections) and/or any suitable number of projections 728 (including no projections) may be used here.

Various types of phase change materials 112, 512, 712 may be used in the thermal actuator switches 100, 500, 700 depending on the implementation. Examples of phase change materials that may be used include water, paraffin wax, salt hydrate, solder, or indium alloy. In some embodiments, the phase change material is selected so that the phase change material contracts at lower temperatures and expands at higher temperatures. Various forms of paraffin wax, salt hydrate, solder, and indium alloy are examples of phase change materials that behave in this manner. In other embodiments, the phase change material is selected so that the phase change material expands at lower temperatures and contracts at higher temperatures. Water is an example of a phase change material that behaves in this manner. Thus, the selection of the phase change material to be used can depend (at least in part) on (i) whether a thermal connection between top and bottom plates is formed or improved in response to expansion or contraction of the phase change material and (ii) whether the thermal connection between the top and bottom plates is broken or lessened in response to expansion or contraction of the phase change material.

Although FIGS. 1 through 8 illustrate examples of PCM-based conductive thermal actuator switches 100, 500, 700, various changes may be made to FIGS. 1 through 8. For example, the sizes, shapes, and dimensions of each thermal actuator switch 100, 500, 700 and its components may vary as needed or desired. For instance, each piston's shape or aspect ratio may be optimized to achieve a desired balance between travel and force. In some cases, the piston plate 110, 510, 710 may be kept as thin as possible to insulate the sides of the piston plate 110, 510, 710 from contacting the housing (primarily the top or bottom plate) of the thermal actuator switch 100, 500, 700. Also, a low thermal conductivity material may be positioned on or along the interface between the piston plate 110, 510, 710 and the top or bottom plate in order to increase thermal resistance and reduce friction at those locations. Further, various additional features may be used with the thermal actuator switches 100, 500, 700. As a particular example, one or more thermal interface materials may be used at the contact interfaces between the piston plate 110, 510, 710 and the top and bottom plates 102-104, 502-504, 702-704 to limit thermal resistance. As another particular example, one or more thermal interface materials may be used at the contact interfaces between the thermal actuator switch 100, 500, 700 and the heat source(s)/heat sink(s) to limit thermal resistance. As yet another particular example, thermal insulation may be used to help ensure that thermal energy transfer occurs substantially through the piston of the thermal actuator switch 100, 500, 700. In addition, multiple phase change materials 112, 512, 712 may be used in the thermal actuator switch 100, 500, 700, such as when the housing of the thermal actuator switch 100, 500, 700 can handle appropriate stresses near the transition temperatures of the phase change materials 112, 512, 712.

It should be noted that while "top" and "bottom" are used to describe the plates 102-104, 502-504, 702-704 of the thermal actuator switches 100, 500, 700, this does not impart any structural or usage limitations on the thermal actuator switches 100, 500, 700. The terms "top" and "bottom" are used merely as a matter of convenience to refer to the positions of the plates as specifically shown in the figures. Each of the thermal actuator switches 100, 500, 700 can be implemented or used in an inverted manner, in a sideways orientation, or in any other suitable orientation or configuration as needed or desired.

It should also be noted that any combination of features shown in FIGS. 1 through 8 could be used in a single thermal actuator switch, whether or not that specific combination of features is shown in the figures or described above. Thus, for instance, the thermal actuator switch 100 could include a plate 102 or 104 with one or more flanges or other projections 524 or 724. Also, the thermal actuator switches 100 and 700 may include thermal straps 526, or the thermal actuator switches 100 and 500 may include one or both of projections 726 and projections 728. In addition, each thermal actuator switch could include any suitable number of each component shown in the figure(s).

Figure 9:
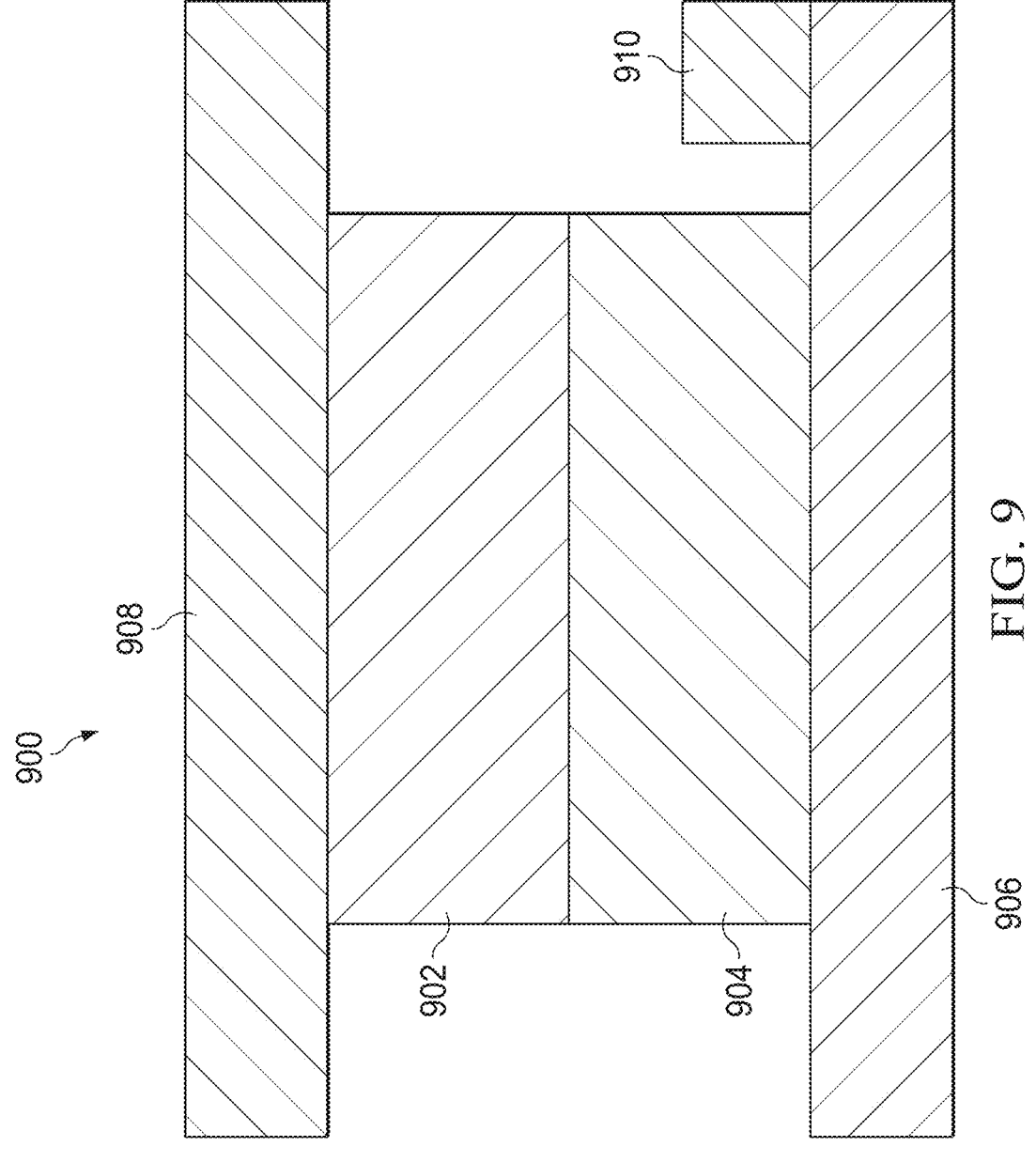
FIG. 9 illustrates a first example stacked arrangement of PCM-based conductive thermal actuator switches according to this disclosure.

FIG. 9 illustrates a first example stacked arrangement 900 of PCM-based conductive thermal actuator switches according to this disclosure. As shown in FIG. 9, the stacked arrangement 900 includes multiple thermal actuator switches 902-904 that are thermally (and possibly mechanically) coupled in series. Each thermal actuator switch 902-904 may represent a separate instance of the thermal actuator switch 100, 500, or 700 described above, although each thermal actuator switch 902-904 may have any other suitable design in which a piston moves based on expansion/contraction of a phase change material.

In some embodiments, the thermal actuator switches 902-904 include different phase change materials 112, 512, 712. For instance, the thermal actuator switch 902 may have one or more phase change materials 112, 512, 712 with a lower transition temperature, and the thermal actuator switch 904 may have one or more phase change materials 112, 512, 712 with a higher transition temperature (or vice versa). In some cases, the lower transition temperature may be about 5° C. or within a range including 5° C., and the higher transition temperature may be about 25° C. or within a range including 25° C. This stacked arrangement 900 therefore allows one of the thermal actuator switches 902-904 to close (such as by expanding or contracting its phase change material 112, 512, 712) at lower temperatures and both of the thermal actuator switches 902-904 to close at higher temperatures. As a result, this helps to provide tunable thermal isolation in the "thru" direction.

As with the thermal actuator switch 100, 500, or 700 described above, the stacked arrangement 900 allows for passive control of thermal energy transfer between at least one heat source 906 and at least one heat sink 908. The at least one heat source 906 represents any suitable source of thermal energy, and the at least one heat sink 908 represents any suitable destination for the thermal energy. Note that the at least one heat source 906 may optionally include or be associated with one or more heaters 910, such as in a cold environment where the heater(s) 910 may be needed to heat one or more devices.

Figure 10:
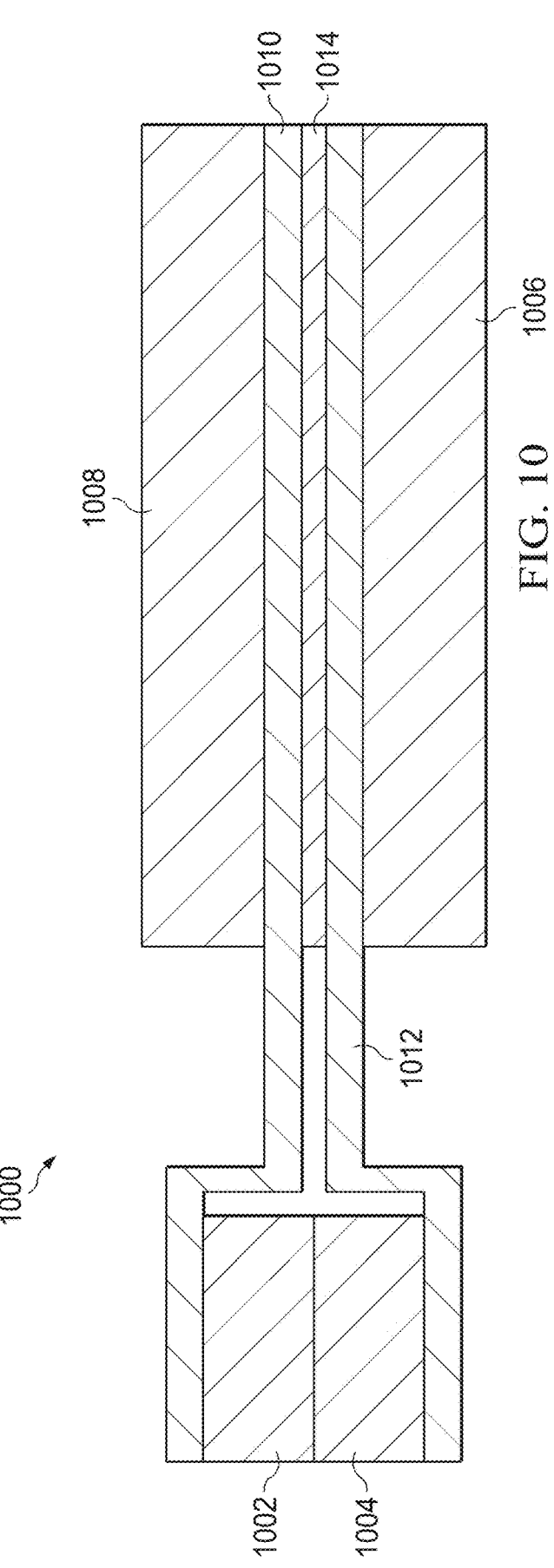
FIG. 10 illustrates a second example stacked arrangement of PCM-based conductive thermal actuator switches according to this disclosure.

FIG. 10 illustrates a second example stacked arrangement 1000 of PCM-based conductive thermal actuator switches according to this disclosure. The stacked arrangement 1000 here is similar to the stacked arrangement 900. As shown in FIG. 10, the stacked arrangement 1000 includes multiple thermal actuator switches 1002-1004 that are thermally coupled in series. Each thermal actuator switch 1002-1004 may represent a separate instance of the thermal actuator switch 100, 500, or 700 described above, although each thermal actuator switch 1002-1004 may have any other suitable design in which a piston moves based on expansion/contraction of a phase change material.

In some embodiments, the thermal actuator switches 1002-1004 include different phase change materials 112, 512, 712. For instance, the thermal actuator switch 1002 may have one or more phase change materials 112, 512, 712 with a lower transition temperature, and the thermal actuator switch 1004 may have one or more phase change materials 112, 512, 712 with a higher transition temperature (or vice versa). In some cases, the lower transition temperature may be about 5° C. or within a range including 5° C., and the higher transition temperature may be about 25° C. or within a range including 25° C. This stacked arrangement 1000 therefore allows one of the thermal actuator switches 1002-1004 to close (such as by expanding or contracting its phase change material 112, 512, 712) at lower temperatures and both of the thermal actuator switches 1002-1004 to close at higher temperatures. As a result, this helps to provide tunable thermal isolation in the "thru" direction.

In this configuration, the stacked arrangement 1000 is not physically positioned between at least one heat source 1006 and at least one heat sink 1008. Instead, the stacked arrangement 1000 is positioned elsewhere, and thermal conductors 1010 and 1012 are used to thermally couple the thermal actuator switches 1002 and 1004 to the heat source(s) 1006 and heat sink(s) 1008. Each thermal conductor 1010 and 1012 represents any suitable structure configured to transfer thermal energy to or from a thermal actuator switch. Effectively, the thermal conductors 1010 and 1012 here function as heat straps to provide thermal energy to and from the stacked arrangement 1000. Each thermal conductor 1010 and 1012 may be formed using any suitable material(s), such as one or more metals, a pyrolytic graphite sheet, or other material(s) having high thermal conductivity. Each thermal conductor 1010 and 1012 may also be formed in any suitable manner. In addition, each thermal conductor 1010 and 1012 may have any suitable size, shape, and dimensions.

A thermally-insulative material 1014 may optionally be positioned between the thermal conductors 1010 and 1012 or portions of the thermal conductors 1010 and 1012. The thermally-insulative material 1014 can help to reduce thermal conduction between the thermal conductors 1010 and 1012 in order to inhibit thermal energy transfer directly between the thermal conductors 1010 and 1012. The thermally-insulative material 1014 may be formed from any suitable material (s), such as a thermally-insulative epoxy or other material(s) used to hold the thermal conductors 1010 and 1012 or a fiberglass sheet or other structure(s) positioned between the thermal conductors 1010 and 1012. The thermally-insulative material 1014 may also be formed in any suitable manner. In addition, the thermally-insulative material 1014 may have any suitable size, shape, and dimensions. Note that if the thermal conductors 1010 and 1012 extend beyond the thermally-insulative material 1014 (as is shown in the embodiment of FIG. 10), the thermal conductors 1010 and 1012 may be reinforced if needed or desired. For instance, at least the portions of the thermal conductors 1010 and 1012 extending beyond the thermally-insulative material 1014 may be formed using pyrolytic graphite sheets or other material(s) and reinforced using Kapton or other reinforcement material(s).

In some embodiments, each of the stacked arrangements 900, 1000 of PCM-based conductive thermal actuator switches may be implemented as follows. The thermal actuator switch that is activated (closed) to enable thermal energy transport through the switch at a higher temperature can be placed closer to a heat sink. The thermal actuator switch that is activated (closed) to enable thermal energy transport through the switch at a lower temperature can be placed closer to a heat source. This may be done to help prevent the thermal actuator switch with the higher activation temperature from "clamping" to a hot environmental temperature at some point that is beyond the control of the overall system (since there may be no active cooling in the loop). Instead, the thermal actuator switch with the higher activation temperature can be clamped to a colder temperature, which can be controlled (such as via a heater). In some cases, the way that the two stacked switches close and open can be opposite of one another, such as when one switch has a phase change material that expands at higher temperatures and the other switch has a phase change material that contracts at higher temperatures. In particular embodiments, water can be used in one of the stacked switches since it tends to behave in the opposite manner than many other phase change materials. Note, however, that the configurations of the switches can be adjusted as needed or desired so that the desired activations of the switches are achieved.

Although FIGS. 9 and 10 illustrate examples of stacked arrangements 900, 1000 of PCM-based conductive thermal actuator switches, various changes may be made to FIGS. 9 and 10. For example, a stacked arrangement of PCM-based conductive thermal actuator switches may be used in any suitable manner. Also, a stacked arrangement of PCM-based conductive thermal actuator switches may include more than two thermal actuator switches, and the thermal actuator switches may or may not include more than two phase change materials that expand/contract at different temperatures.

Figure 11:
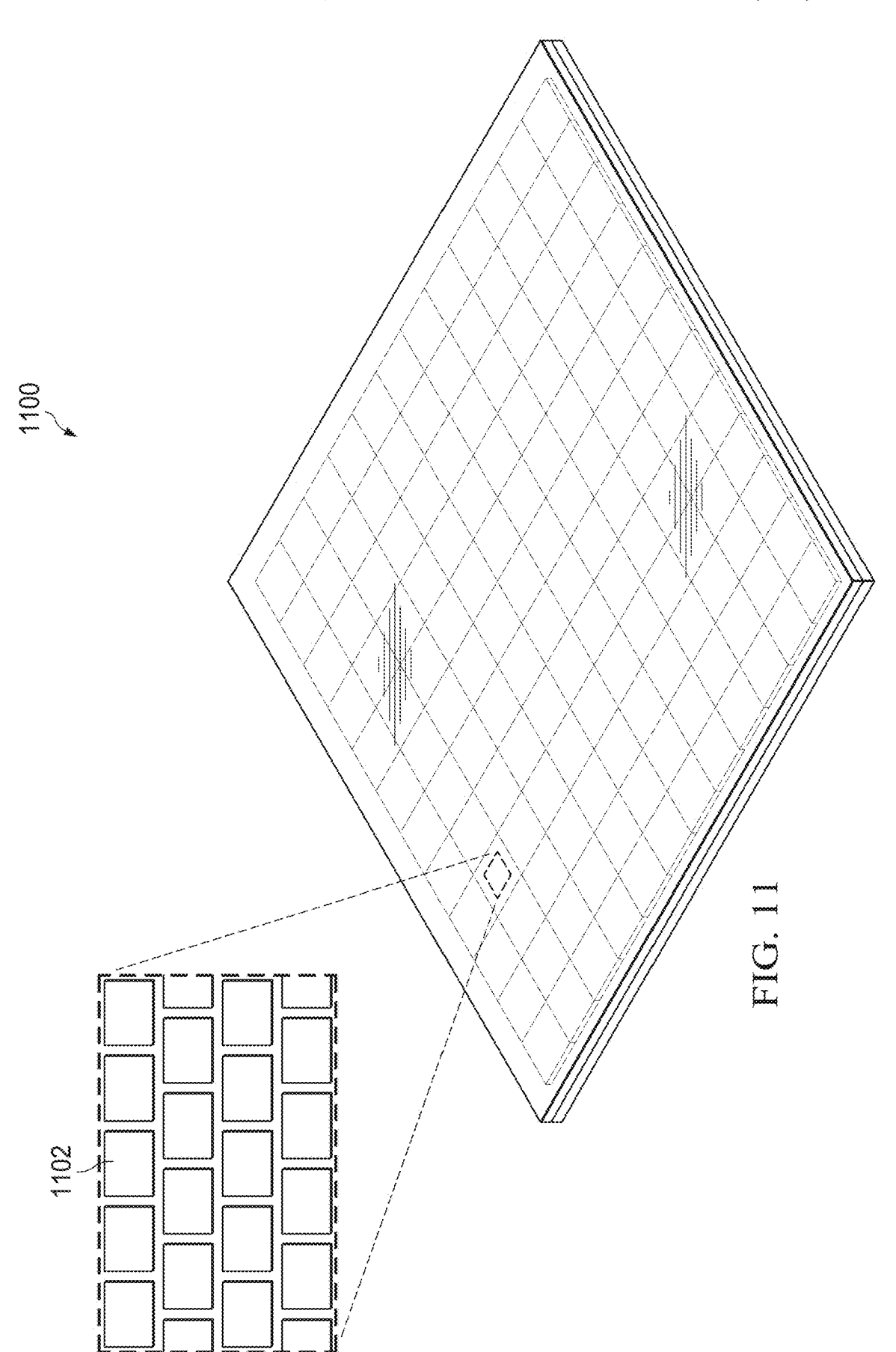
FIG. 11 illustrates an example array of PCM-based conductive thermal actuator switches according to this disclosure.

FIG. 11 illustrates an example array 1100 of PCM-based conductive thermal actuator switches according to this disclosure. As shown in FIG. 11, the array 1100 includes array elements, where each array element includes a thermal actuator switch 1102. As can be seen here, the thermal actuator switches 1102 are arranged in parallel, meaning the thermal actuator switches 1102 can each independently be used to transfer thermal energy between at least one heat source and at least one heat sink. Each thermal actuator switch 1102 may represent a separate instance of the thermal actuator switch 100, 500, or 700 described above, although each thermal actuator switch 1102 may have any other suitable design in which a piston moves based on expansion/contraction of a phase change material. In some embodiments, each array element in the array 1100 shown in FIG. 11 may include a stacked arrangement of multiple thermal actuator switches 1102, such as the arrangement shown in FIG. 9.

The use of a parallel arrangement of thermal actuator switches 1102 can help to control the temperature of one or more devices and to control a temperature gradient across the one or more devices, For example, the one or more devices can be maintained within a desired temperature range and can maintain a desired temperature gradient (or have a temperature gradient within a desired temperature gradient range) across one or more surfaces of the device(s). In this example, the thermal actuator switches 1102 are generally arranged in rows, and the rows are staggered relative to one another (meaning each thermal actuator switch 1102 is not aligned with thermal actuator switches 1102 in the adjacent rows). This type of arrangement may be useful in helping to reduce or minimize lateral heat transfer between the thermal actuator switches 1102. However, aligned thermal actuator switches 1102 may also be used.

Note that the sizes of the thermal actuator switches 1102 shown here can vary. as can the spacings between the thermal actuator switches 1102 in each row and the spacings between the thermal actuator switches 1102 in different rows. In some cases, the spaces between the thermal actuator switches 1102 can be at least partially filled, such as by one or more thermally-insulative materials that help to limit thermal conduction substantially to the locations where the thermal actuator switches 1102 are positioned.

Although FIG. 11 illustrates one example of an array 1100 of PCM-based conductive thermal actuator switches, various changes may be made to FIG. 11. For example, a parallel arrangement of PCM-based conductive thermal actuator switches may be used in any suitable manner. Also, an array 1100 of PCM-based conductive thermal actuator switches may include any suitable number of thermal actuator switches 1102 in any suitable layout.

The following describes example embodiments of this disclosure that implement or relate to PCM-based conductive thermal actuator switches. However, other embodiments may be used in accordance with the teachings of this disclosure.

In a first embodiment, an apparatus includes multiple thermal actuator switches configured to control a transfer of thermal energy through the apparatus, where the thermal actuator switches are arranged in a stacked configuration. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position. The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

In a second embodiment, a system includes at least one heat source and at least one heat sink. The system also includes multiple thermal actuator switches configured to control a transfer of thermal energy between the at least one heat source and the at least one heat sink, where the thermal actuator switches are arranged in a stacked configuration. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position, The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

In a third embodiment, a method includes receiving thermal energy at multiple thermal actuator switches from at least one heat source, where the thermal actuator switches are arranged in a stacked configuration. The method also includes controlling a transfer of the thermal energy between the at least one heat source and at least one heat sink using the thermal actuator switches. Each thermal actuator switch includes first and second plates and a piston movable between the first and second plates. Each thermal actuator switch also includes a phase change material configured to (i) expand to move a surface of the piston into a first position and (ii) contract to allow the surface of the piston to move into a second position. The surface of the piston thermally contacts the first plate and increases thermal energy transfer between the first and second plates when in one of the first and second positions. The surface of the piston is spaced apart from the first plate and decreases thermal energy transfer between the first and second plates when in another of the first and second positions. Different ones of the thermal actuator switches include different phase change materials that expand or contract at different temperatures.

Any single one or any suitable combination of the following features may be used with the first, second, or third embodiment. Each thermal actuator switch may include a return configured to move the piston when the phase change material contracts. The return of each thermal actuator switch may include one or more springs or magnets. The thermal actuator switches may include first and second thermal actuator switches, the first and second thermal actuator switches may respectively include first and second phase change materials, and the first phase change material may expand or contract at a different temperature than the second phase change material. An array may include multiple array elements, and each array element may include two or more of the thermal actuator switches in the stacked configuration. Multiple heat straps may transport thermal energy to and from the thermal actuator switches.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example. "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
multiple thermal actuator switches configured to control a transfer of thermal energy through the apparatus, the thermal actuator switches arranged in a stacked configuration, each thermal actuator switch comprising:
    first and second plates;
    a piston movable between the first and second plates; and
    a phase change material configured to (i) expand to move a surface of the piston into a first position and (ii) contract to allow the surface of the piston to move into a second position, the surface of the piston configured to thermally contact the first plate and increase thermal energy transfer between the first and second plates, the surface of the piston also configured to be spaced apart from the first plate and decrease thermal energy transfer between the first and second plates;
wherein different ones of the thermal actuator switches comprise different phase change materials that expand or contract at different temperatures.

2. The apparatus of claim 1, wherein each thermal actuator switch further comprises a return configured to move the piston when the phase change material contracts.

3. The apparatus of claim 2, wherein the return of each thermal actuator switch comprises one or more springs.

4. The apparatus of claim 2, wherein the return of each thermal actuator switch comprises multiple magnets.

5. The apparatus of claim 1, wherein:
the thermal actuator switches comprise first and second thermal actuator switches;
the first and second thermal actuator switches respectively include first and second phase change materials; and the first phase change material is configured to expand or contract at a different temperature than the second phase change material.

6. The apparatus of claim 1, wherein:

an array comprises multiple array elements; and each array element includes two or more of the thermal actuator switches in the stacked configuration.

7. The apparatus of claim 1, further comprising:

multiple heat straps configured to transport thermal energy to and from the thermal actuator switches.

8. A system comprising:

at least one heat source;

at least one heat sink; and multiple thermal actuator switches configured to control a transfer of thermal energy between the at least one heat source and the at least one heat sink, the thermal actuator switches arranged in a stacked configuration, each thermal actuator switch comprising:

first and second plates;

a piston movable between the first and second plates; and a phase change material configured to (i) expand to move a surface of the piston into a first position and (ii) contract to allow the surface of the piston to move into a second position, the surface of the piston configured to thermally contact the first plate and increase thermal energy transfer between the first and second plates, the surface of the piston also configured to be spaced apart from the first plate and decrease thermal energy transfer between the first and second plates;

wherein different ones of the thermal actuator switches comprise different phase change materials that expand or contract at different temperatures.

9. The system of claim 8, wherein each thermal actuator switch further comprises a return configured to move the piston when the phase change material contracts.

10. The system of claim 9, wherein the return of each thermal actuator switch comprises one or more springs.

11. The system of claim 9, wherein the return of each thermal actuator switch comprises multiple magnets.

12. The system of claim 8, wherein:

the thermal actuator switches comprise first and second thermal actuator switches;

the first and second thermal actuator switches respectively include first and second phase change materials; and the first phase change material is configured to expand or contract at a different temperature than the second phase change material.

13. The system of claim 8, wherein:

an array comprises multiple array elements; and each array element includes two or more of the thermal actuator switches in the stacked configuration.

14. The system of claim 8, further comprising:

multiple heat straps configured to transport thermal energy between (i) the at least one heat source and the at least one heat sink and (ii) the thermal actuator switches.

15. A method comprising:

receiving thermal energy at multiple thermal actuator switches from at least one heat source, the thermal actuator switches arranged in a stacked configuration; and controlling a transfer of the thermal energy between the at least one heat source and at least one heat sink using the thermal actuator switches;

wherein each thermal actuator switch comprises:

first and second plates;

a piston movable between the first and second plates; and a phase change material configured to (i) expand to move a surface of the piston into a first position and (ii) contract to allow the surface of the piston to move into a second position, the surface of the piston configured to thermally contact the first plate and increase thermal energy transfer between the first and second plates, the surface of the piston also configured to be spaced apart from the first plate and decrease thermal energy transfer between the first and second plates;

wherein different ones of the thermal actuator switches comprise different phase change materials that expand or contract at different temperatures.

16. The method of claim 15, further comprising:

in each thermal actuator switch, using a return to move the piston when the phase change material contracts.

17. The method of claim 16, wherein the return of each thermal actuator switch comprises one or more springs or magnets.

18. The method of claim 15, wherein:

the thermal actuator switches comprise first and second thermal actuator switches;

the first and second thermal actuator switches respectively include first and second phase change materials; and the first phase change material is configured to expand or contract at a different temperature than the second phase change material.

19. The method of claim 15, wherein:

an array comprises multiple array elements; and each array element includes two or more of the thermal actuator switches in the stacked configuration.

20. The method of claim 15, further comprising:

using multiple heat straps to transport thermal energy between (i) the at least one heat source and the at least one heat sink and (ii) the thermal actuator switches.

* * * * *